(12) United States Patent
Ogren

(10) Patent No.: US 8,707,212 B2
(45) Date of Patent: Apr. 22, 2014

(54) GRAPHICAL USER INTERFACE FOR EXPANDABLE MENUS

(75) Inventor: Per Ogren, Malmo (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1555 days.

(21) Appl. No.: 10/519,130

(22) PCT Filed: Jun. 4, 2003

(86) PCT No.: PCT/EP03/05842
§ 371 (c)(1),
(2), (4) Date: Jan. 15, 2008

(87) PCT Pub. No.: WO03/104964
PCT Pub. Date: Dec. 18, 2003

(65) Prior Publication Data
US 2010/0042951 A1 Feb. 18, 2010

Related U.S. Application Data

(60) Provisional application No. 60/387,050, filed on Jun. 7, 2002.

(30) Foreign Application Priority Data

Jun. 6, 2002 (EP) .................................... 02445072

(51) Int. Cl.
*G06F 3/0482* (2013.01)

(52) U.S. Cl.
USPC ............ 715/841; 715/820; 715/828; 715/854

(58) Field of Classification Search
USPC .................................. 715/820, 828, 841, 854
See application file for complete search history.

(56) References Cited

U.S. PATENT DOCUMENTS

| 5,801,703 A | 9/1998 | Bowden et al. |
| 6,005,567 A | 12/1999 | Nielsen et al. |

FOREIGN PATENT DOCUMENTS

| EP | 1 182 853 A2 | 2/2002 |
| GB | 2 354 142 A | 3/2001 |
| JP | 2000-155638 | 6/2000 |

OTHER PUBLICATIONS

International Preliminary Examination Report and Search Report for PCT/EP 03/05842, dated Oct. 6, 2005.

*Primary Examiner* — Namitha Pillai
(74) *Attorney, Agent, or Firm* — Myers Bigel Sibley & Sajovec, P.A.

(57) ABSTRACT

A graphical user interface for a display devised for presentation of hierarchical information includes a first menu field carrying a list of menu items, at least one of the menu items indicating a submenu field which is expandable within the first menu field. A graphical layer effect is applied to an expanded submenu field such that the submenu field is displayed as an underlying layer to the first menu field.

12 Claims, 4 Drawing Sheets

GRAPHICAL USER INTERFACE FOR EXPANDABLE MENUS

RELATED APPLICATIONS

The present application is a 35 U.S.C. §371 national phase application of PCT International Application No. PCT/EP03/05842, having an international filing date of Jun. 3, 2003 and claiming priority to European Patent Application No. 02445072.8, filed Jun. 6, 2002 and U.S. Provisional Application No. 60/387,050 filed Jun. 7, 2002, the disclosures of which are incorporated herein by reference in their entireties. The above PCT International Application was published in the English language and has International Publication No. WO 03/104964 A2.

FIELD OF THE INVENTION

The present invention relates generally to graphical user interfaces presentable on displays for e.g. computers, television sets and so on. The invention is however particularly suitable for small displays, such as those used in cellular or mobile phones, and offers an improved solution for displaying and navigating in menus in a comprehensible manner.

BACKGROUND OF THE INVENTION

Since the end of the $2000^{th}$ century the cellular telephone industry has had enormous development in the world. The first commercially attractive cellular telephones or terminals were introduced in the market at the end of the 1980's. Since then, a lot of effort has been made in making smaller terminals, with much help from the miniaturisation of electronic components and the development of more efficient batteries. Today, numerous manufacturers offer pocket-sized terminals with a wide variety of capabilities and services, such as packet-oriented transmission and multiple radio band coverage.

The development in electronics has come to the point where a further miniaturisation of the terminals might cause some drawbacks—not the size itself but the capability to handle the keypad and reading the display. However, the display has in fact become larger and larger at the same time as the size of the total terminal has decreased. For several years it has been expected that the design of the terminals will become more alike the small pocket computers known as personal digital assistants (PDA), with only few buttons or keys and a large display substantially covering the entire front side of the terminal. In any case, the terminal display will still be quite small and therefore not suitable for presentation of large volumes of data. Still, already today the terminals are quite capable and have a lot of technical functions and can be used for many different services. In order to navigate through the different options and actions that are selectable, the terminals are generally devised with some form of menu information system. When browsing through such menus more text than fits the screen must generally still be viewed. Furthermore, in many cases the menu items themselves are sub-menus in which further browsing can be made. When the display is very small, which would still be the case even if the display would cover the entire front-side of the phone, it is not possible to expand menus horizontally more than maybe a few pixels. Most menus for portable terminals therefore expand vertically or open up into a whole new screen mode.

One problem with drop-down menus is that they cover what is beneath them when they unfold. Most times the menu-items of terminal menu are arranged in the order of expected frequency of use. This means that when the menu drops down to expand it covers items which are frequently used i.e. those immediately below the expanded menu item, but leaves the not so frequently used menu items further down the list still visible. Another problem with drop down menus is that there is no hierarchical feeling visualising the interdependence between the different menus, and no good way to present several drop-downs within each other.

U.S. Pat. No. 5,801,703 disclose a method and an apparatus for selectable expandable menus for computers. According to the proposed solution, expanded menu panels within a given master menu are expanded in place, leaving the relative order of menu items intact. However, the sub-menus or expanded menu items are simply presented on a larger space in the main menu without a clear identification of the hierarchical structure.

SUMMARY OF THE INVENTION

Consequently it is an object of the present invention to overcome the above-identified deficiencies related to the identified field and to the prior art thereof. More specifically, it is an object of the invention to provide an improved solution for expandable menus suitable for small displays.

According to a first aspect of the invention, this object is fulfilled by a graphical user interface for a display devised for presentation of hierarchical information, which user interface comprises a first menu field carrying a list of menu items, at least one of said menu items indicating a sub-menu field which is expandable within said first menu field. The user interface further comprises a graphical layer effect, which is applied to an expanded sub-menu field, such that the sub-menu field is displayed as an underlying layer to the first menu field. This provides an improved solution for displaying menus, particularly on small displays, without distorting the sense of hierarchy between two or more menus.

Preferably, the graphical user interface is devised such that for an expanded submenu field, located between two menu items, the first menu field is displayed as being separated into two first menu fields revealing said underlying layer there between. This way, the submenu will not cover the first main menu.

In one embodiment the graphical effect comprises the visualisation of an edge between displayed layers. This gives a user or viewer of the display a further improved sense of the menu hierarchy, by presentation of a submenu as a lying under the first main menu and thus providing a level effect. Optionally or additionally, the graphical effect may comprise the visualisation of a shadow on an underlying layer from an overlying layer, which also creates or enhances the level effect between the menus.

In one embodiment a displayed overlying layer is defined by a field enclosed by a contour having rounded corners. Optionally or additionally a displayed overlying layer may be defined by a field enclosed by a contour having corners with an inner angle of more than 90°. A graphical user interface is generally looked upon as, an is indeed designed to be, an illustration of a physical structure, e.g. in the case of menus as a pile of papers or files. Furthermore, such physical objects rarely have corners that are more sharp than 90°. Rather, if such corners are not straight, they are generally slightly rounded or at least less sharp than 90°. For a viewer it is therefore natural to perceive a field according to this embodiment as the higher level.

The menu item for an expanded submenu field may further be displayed in the underlying layer of the submenu field. This provides an improved connection between the menus.

Preferably, the parameter headings in said first menu field are arranged in an order determined by frequency of use. This way, if the display is smaller than the expanded menu, the menu items of less significance, located under an opened submenu, are shifted downwards and out of the display upon expansion rather than the upper more significant items.

In one embodiment a selection indicator comprises a contour formed around a selected menu item in a list, and a graphical layer effect to said contour, e.g. according to the above.

Furthermore, the graphical user interface may comprise an item triggering field which can be activated to trigger an action associated with a menu item selected by said selection indicator.

According to a second aspect, the present invention fulfils the stated objects by a graphical interface system, which comprises a display connected to a microprocessor unit, and a computer program including computer program code. According to the invention the computer program code will, when executed by the microprocessor unit, trigger the microprocessor unit to present, on said display, the graphical user interface as described above.

According to a third aspect of the invention, the objects stated are further fulfilled by a computer program product for a graphical user interface system, which system comprises a micro-processor unit and a display, wherein said computer program product includes the computer program code as mentioned above.

According to a fourth aspect the present invention relates to a portable communication terminal comprising a display and means for executing presentations on said display of the graphical user interface according to the above.

BRIEF DESCRIPTION OF THE DRAWINGS

The features and advantages of the present invention will be more apparent from the following description of the preferred embodiments with reference to the accompanying drawings, on which FIGS. 1a-1c schematically illustrates a graphical user interface according to an embodiment of the present invention.

DETAILED DESCRIPTION OF PREFERRED EMBODIMENTS

Figures 1A, 1B, 1C:
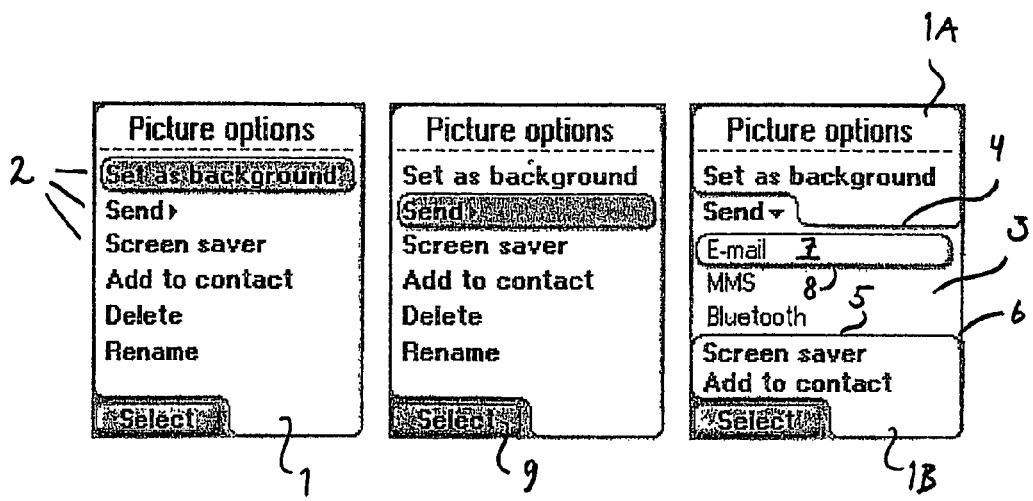

As described in claim 1 the graphical user interface of the invention involves a graphical layer effect for separating sub-menus that are presented in the same screen as higher hierarchy menus. FIGS. 1a-1c show a graphical user interface displaying the main menu 1 "Picture Options". Within that menu there are six different menu items 2, of which the second "Send" encloses a sub-menu, indicated by the arrow for that item. Scrolling in the menu may be performed by using arrow keys of a connected key pad, by using a mouse or joy stick, or simply by directly marking the selected menu item by use of a suitable tool if the display is touch sensitive. A selected menu item is indicated using a selection indicator 7, which in FIG. 1a is located at the first menu item of menu 1. In FIG. 1b the selection indicator 7 is moved down one step to the second menu item "Send" for instance by any of the aforementioned means for scrolling to or selecting an item. In order to activate a selected menu item different solutions may be used. One of those is to use a specific key of associated apparatus, such as the "Yes" key of a mobile phone, by double clicking on a mouse pointing to a selected item, or using a tool for pressing a separate item triggering field 9. Since, in this case, the selected menu item is the entrance to a sub-menu, the activation of the selected item will unfold that sub-menu.

Figure 6:
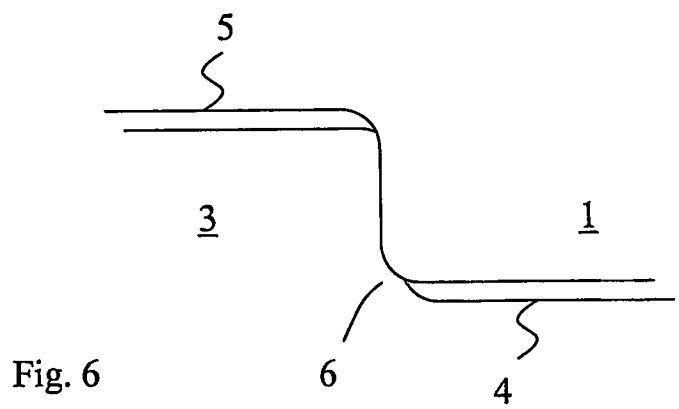
FIGS. 6-8 schematically illustrate embodiments for achieving a layered graphical effect between different levels of menus.
Figure 7:
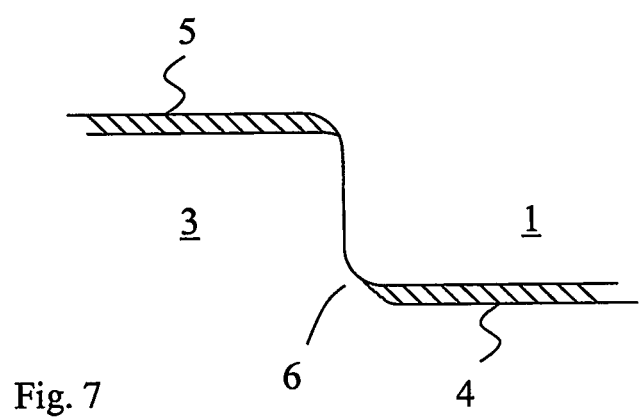
Figure 8:
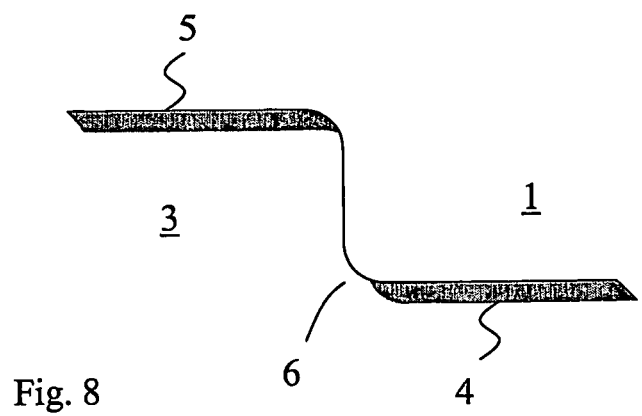

FIG. 1c discloses the advantageous way according to the invention of displaying a sub-menu 3 within a given main menu 1. The graphical layer effect of the invention is used to split up the main menu field 1 into two parts 1a and 1b, between which an underlying layer 3 comprising the sub menu is shown. There are different ways of using a graphical layer effect for displaying the sub-menu as an underlying layer. In one embodiment the contour 5 delimiting the main menu 1a, 1b from sub-menu 3 is designed such that a graphical depth is perceived by the viewer. The graphical layer effect can be seen in FIGS. 1a-2b but is more clearly illustrates in FIGS. 6-8. FIG. 6 illustrates an example wherein the graphical layer effect is an auxiliary contour 4 presented as a shadow of the contour 5 of the main menu 1. In FIG. 8 the graphical layer effect is achieved by a shadow 4 projected on the sub-layer 3 from the overlaying layer of the main menu 1, whereas FIG. 7 illustrates an embodiment in which the upper layer 1 is presented as having a certain thickness and therefore a side edge for down towards the lower layer 3. As a person skilled in the art would realise these are merely examples of how the layer effects can be presented.

Another feature useable for presenting the menus at seemingly different layers are to use rounded corners for the overlying layer 1. This is visible both in FIGS. 1a-2b and in FIGS. 6-8, wherein 6 denotes a rounded corner in delimiting contour 5 of the upper layer 1 or 1a, 1b. By viewing a graphical user interface for instance as presented in FIG. 1c, the viewer will automatically perceive layer 1a, 1b as lying over layer 3. It should be noted that even though, in the shown embodiments, the sub-menu is presented as a underlying layer to the main menu, the opposite relation could of course also be used, wherein a sub-menu 3 is presented as an overlying layer with a graphical layer effect 4, 6 with a shadow or edge feature and/or rounded corners of the sub-menu field 3. Instead of using rounded corners, the corner portions may be segmented (not shown) such that each corner has an inner angle of more than 90°, e.g. in the shape of a diagonally cut off corner. The same effect is obtained, wherein the field with rounded or cut off corners will be perceived by a viewer as lying on top of a neighbouring field.

The sub-menu could be closed in any of a number of ways: it can be closed when an item is activated, when a user scrolls out of the sub-menu, when the title is selected and activated, or with another closing function. If the item 2 containing the sub-menu is at the top of the screen the expansion of the sub-menu is preferably downwards, in other words the lower part 1b of the main menu 1 slides downwards to create the gap 3 in which the sub-menu is visualised. However, if the item containing the sub-menu is at the bottom of the screen, the expansion will preferably be upwards, sliding the upper part 1*a* of the main menu upwards. The menu list order is however still intact, and the items with highest priority is still seen beneath the sub-menu expansion. In the preferred embodiments, as illustrated in the FIGS. 1*a*-2*b*, the title of the menu item "send" or "zoom" remains on the screen in the sub-menu 3 as a heading for the options, which makes it very easy to see to which menu item the displayed options belong.

Figures 2A, 2B:
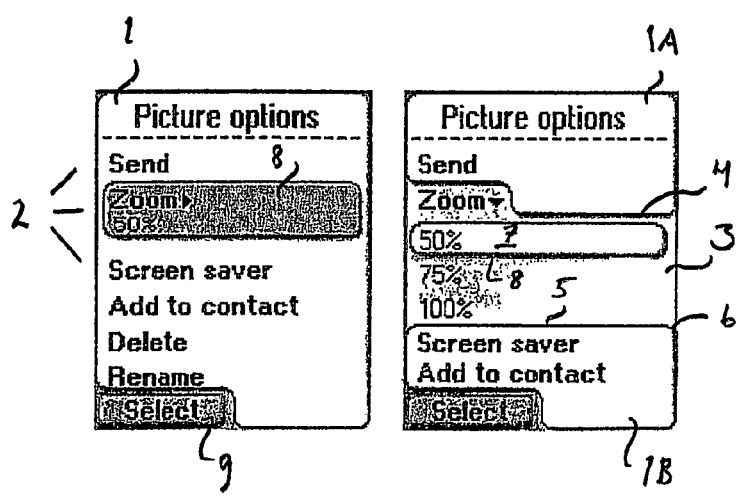
FIGS. 2a-2b schematically illustrates a second embodiment of the graphical user interface according to the present invention.

FIGS. 2*a* and 2*b* show an alternative embodiment to that of FIG. 1*a*-1*c* wherein the submenu of an item 2 contains multiple options for a certain parameter, in this case "Zoom". According to this embodiment, the current setting of that parameter, "50%" in the example of the drawing, is displayed with the menu item 2 also in the main menu 1. This information is thus accessible without having to open up the submenu field 3, wherein fewer actions are needed to gain desired knowledge of the current status.

Figure 3:
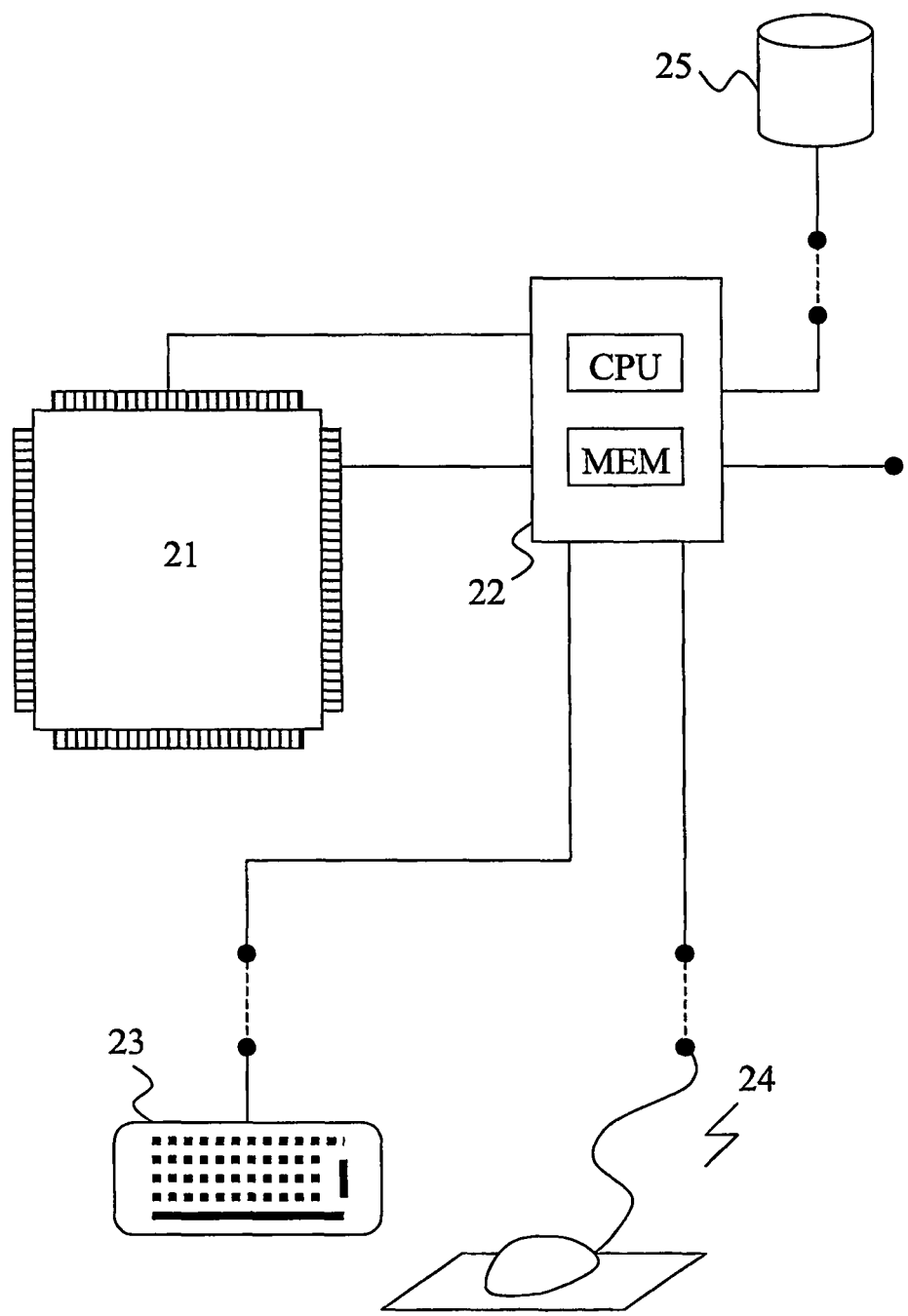
FIG. 3 illustrate by way of example included and connectable parts of a graphical interface system according to an embodiment of the present invention.

FIG. 3 discloses a graphical interface system according to an embodiment of the invention. As display 21 is communicatively connected to a microprocessor unit 22, which in turn includes at least a computer processor CPU and an internal memory MEM. The hardware of the microprocessor unit is further associated with a computer program product comprising software for handling the presentation of information on the display 21, by use of a graphical user interface according to the present invention. In order to input data to the microprocessor unit 22, some form of data input means are preferably connectable thereto, for instance a key board or a key pad 23 and/or a cursor control device 24 such as a mouse, a track ball or a joy stick. The microprocessor unit 22 may also be connectable to a an external memory or database 25, in the embodiment of the communication terminal such as a mobile phone, memory 25 may be or correspond to a subscriber identification module SIM connectable to the terminal. According to the invention, the computer program product comprises computer program code which can be stored in the memory MEM of the microprocessor unit 22 and which, when executed by the microprocessor unit, triggers the microprocessor unit to present a graphical user interface according to what has been described in relation to FIGS. 1*a*-2*b* and FIGS. 6-8, on the display 21.

Figure 4:
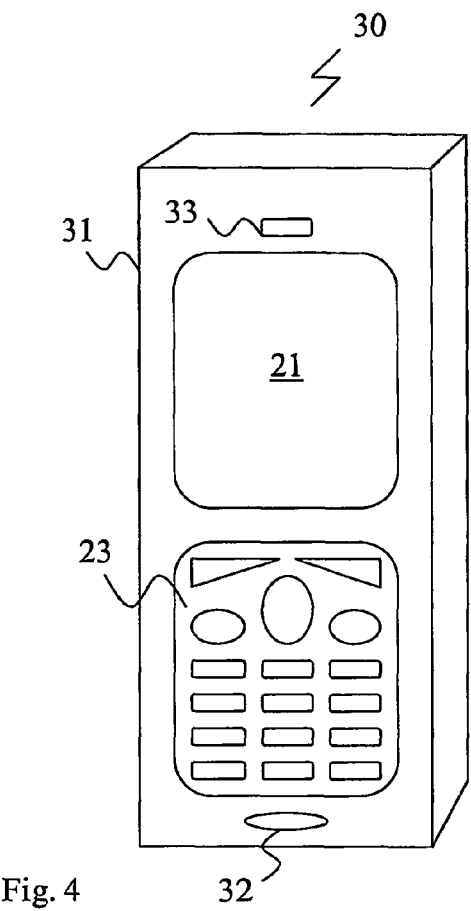
FIG. 4 shows a first embodiment of a portable communication terminal on which the graphical user interface of the present invention may be applied.

FIG. 4 shows an example of a portable communication terminal, such as a mobile phone 30, of more or less standard appearance. A portable communication terminal includes all mobile equipment devised for radio communication with a radio station, which radio station may also be a mobile terminal or for instance a stationary base station. Consequently, the term portable communication terminal includes mobile phones, pagers, communicators, electronic organizers, smart phones, PDA:s (Personal Digital Assistance), vehicle mounted radio communication devices or the like as well as portable laptop computer devised for wireless communication in for instance a WLAN (Wireless Local Area Network). Furthermore, since the graphical user interface of the present invention, as such, is not restricted to wireless use, it should be noted that the present invention is also applicable to standard desktop computers, television sets, fax machines or the like. The terminal 30 of FIG. 4 comprises a chassis or housing 31, carrying a user audio input in the form of a microphone 32 and a user audio output in the form of a speaker 33 or connected to an ear piece (not shown). A set of keys, buttons or the like constitutes a data input interface 23 useable for instance for dialing according to the established art. The data output interface comprises a display 21 devised to present communication information by use of graphical user interface in accordance with the present invention.

Figure 5:
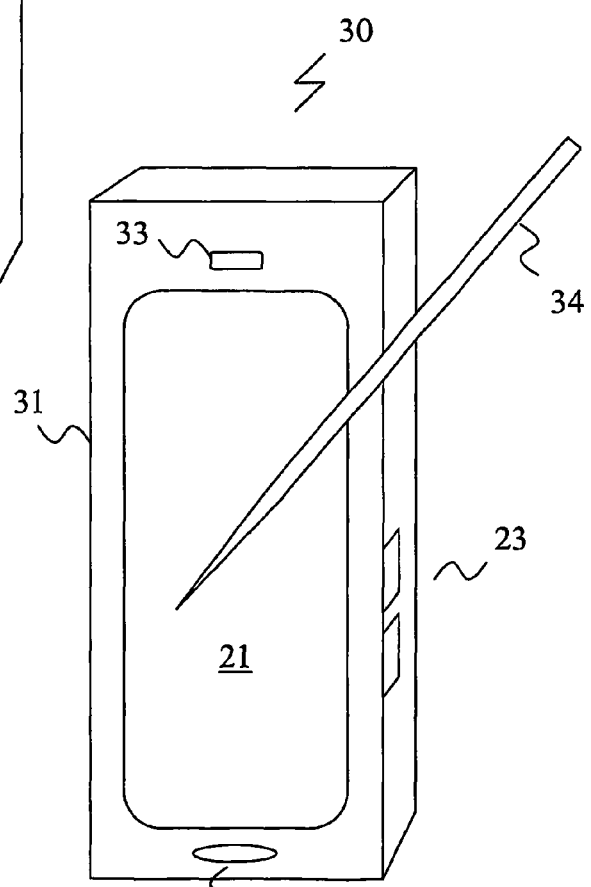
FIG. 5 shows a second embodiment of a portable communication terminal suitable for use with an embodiment of the graphical user interface according to the present invention.

FIG. 5 shows a different embodiment of a portable communication terminal 30, in which like features carry the same references as in FIG. 4. A difference between embodiments of FIGS. 5 and 4 is mainly that a larger part of the front face of the terminal in FIG. 5 is occupied of the display 21, to which several of the functions of the key board 23 has been transferred. By pressing directly on the screen of display 21, by use of the fingers or a specific tool 34, the number of buttons has been decreased and remaining keys are preferably moved to the side or sides of the terminal 30. Even with the design as illustrated in FIG. 5, the display 21 will generally be quite small compared to at least a standard desktop computer, and consequently the expandable menu system using a graphical layer effect according to the present invention will be highly suitable also for future portable terminals as that of FIG. 5.

The foregoing has described the principles, preferred embodiments and modes of operation of the present invention. However, the invention should not be construed as limited to the particular embodiments discussed. For example, any or all of the disclosed embodiments for achieving a graphical depth effect as disclosed on FIGS. 6-8 including the use of rounded corners can be used either isolated or in combination. Furthermore, the use of a graphical depth effect also on a selection indicator 7 devised to show which menu item is currently selected further increases the ease of use, since the selected item will then always appear as a higher layer than the currently active menu or sub-menu.

The above described embodiments should be regarded as illustrative rather than restrictive, and it should be appreciated that variations may be made in those embodiments by persons skilled in the arts without departing from the scope of the present invention as defined by the following claims.

What is claimed is:

1. A graphical user interface for a mobile telephone devised for presentation of hierarchical information, comprising:
    a first menu field carrying a list of menu items, at least one of the menu items indicating a submenu field which is expandable within the first menu field, wherein a graphical layer effect is applied to an expanded submenu field such that expanded submenu field is displayed as a different layer than the first menu field, wherein, for an expanded submenu field located between two menu items, the first menu field is displayed as being separated into two first menu fields revealing the submenu field as an underlying layer therebetween; and
    a selection indicator comprising a contour formed around a selected menu item in the expanded submenu field and a graphical layer effect applied to the contour to display the selection indicator as a layer above the underlying layer of the submenu field.

2. The graphical user interface as recited in claim 1, wherein the graphical layer effect comprises visualization of an edge between displayed layers.

3. The graphical user interface as recited in claim 1, wherein the graphical layer effect comprises a shadow on the underlying layer from an overlying layer.

4. The graphical user interface as recited in claim 1, wherein a displayed overlying layer is defined by a field enclosed by a contour having rounded corners.

5. The graphical user interface as recited in claim 1, wherein a displayed overlying layer is defined by a field enclosed by a contour having corners with an inner angle of more than 90°.

6. The graphical user interface as recited in claim 1, wherein the menu item for the expanded submenu field is displayed in the underlying layer of the submenu field.

7. The graphical user interface as recited in claim 1, wherein the parameter headings in the first menu field are arranged in an order determined by frequency of use.

8. The graphical user interface as recited in claim 1, further comprising an item triggering field which can be activated to trigger an action associated with a menu item selected by the selection indicator.

9. The graphical user interface as recited in claim 1, wherein the first menu field comprises an outer border defining an area therein, and when the submenu field is expanded within the first menu field, the area of the outer boarder remains the same.

10. A graphical interface system for a mobile telephone comprising a display connected to a microprocessor unit, and a computer program including computer program code which, when executed by the microprocessor unit, triggers the microprocessor unit to present, on the display, a graphical user interface comprising: a first menu field carrying a list of menu items, at least one of the menu items indicating a submenu field which is expandable within the first menu field, wherein a graphical layer effect is applied to an expanded submenu field such that the expanded submenu field is displayed as a different layer than the first menu field wherein, for an expanded submenu field located between two menu items, the first menu field is displayed as being separated into two first menu fields revealing the submenu field as an underlying layer therebetween; and a selection indicator comprising a contour formed around a selected menu item in the expanded submenu field and a graphical layer effect applied to the contour to display the selection indicator as a layer above the underlying layer of the submenu field.

11. A computer program product for a graphical user interface system of a mobile telephone comprising:

a computer readable medium having computer readable program code embodied therein, the computer readable program code comprising:

computer readable program code configured to provide a first menu field carrying a list of menu items, at least one of the menu items indicating a submenu field which is expandable within the first menu field;

computer readable program code configured to apply a graphical layer effect to an expanded submenu field such that the expanded submenu field is displayed as a different layer than the first menu field and for an expanded submenu field located between two menu items, the first menu field is displayed as being separated into two first menu fields revealing the submenu field as an underlying layer therebetween; and computer readable program code configured to display a selection indicator comprising a contour formed around a selected menu item in the expanded submenu field and a graphical layer effect applied to the contour to display the selection indicator as a layer above the underlying layer of the submenu field.

12. A portable communication terminal comprising a display and a means for executing a presentation on the display of a graphical user interface, the graphical user interface comprising a first menu field carrying a list of menu items, at least one of the menu items indicating a submenu field which is expandable within the first menu field, wherein a graphical layer effect is applied to an expanded submenu field such that the expanded submenu field is displayed as a different than the first menu field, and wherein, for an expanded submenu field located between two menu items, the first menu field is displayed on the graphical user interface as being separated into two first menu fields revealing the submenu field as an underlying layer therebetween, and the graphical user interface further comprises a selection indicator comprising a contour formed around a selected menu item in the expanded submenu field and a graphical layer effect applied to the contour to display the selection indicator as a layer above the underlying layer of the submenu field.

* * * * *